Sept. 27, 1949.  F. NETTEL ET AL  2,482,791
NAVAL POWER PLANT

Filed April 20, 1945  2 Sheets-Sheet 1

INVENTORS
Frederick Nettel.
John Kreitner

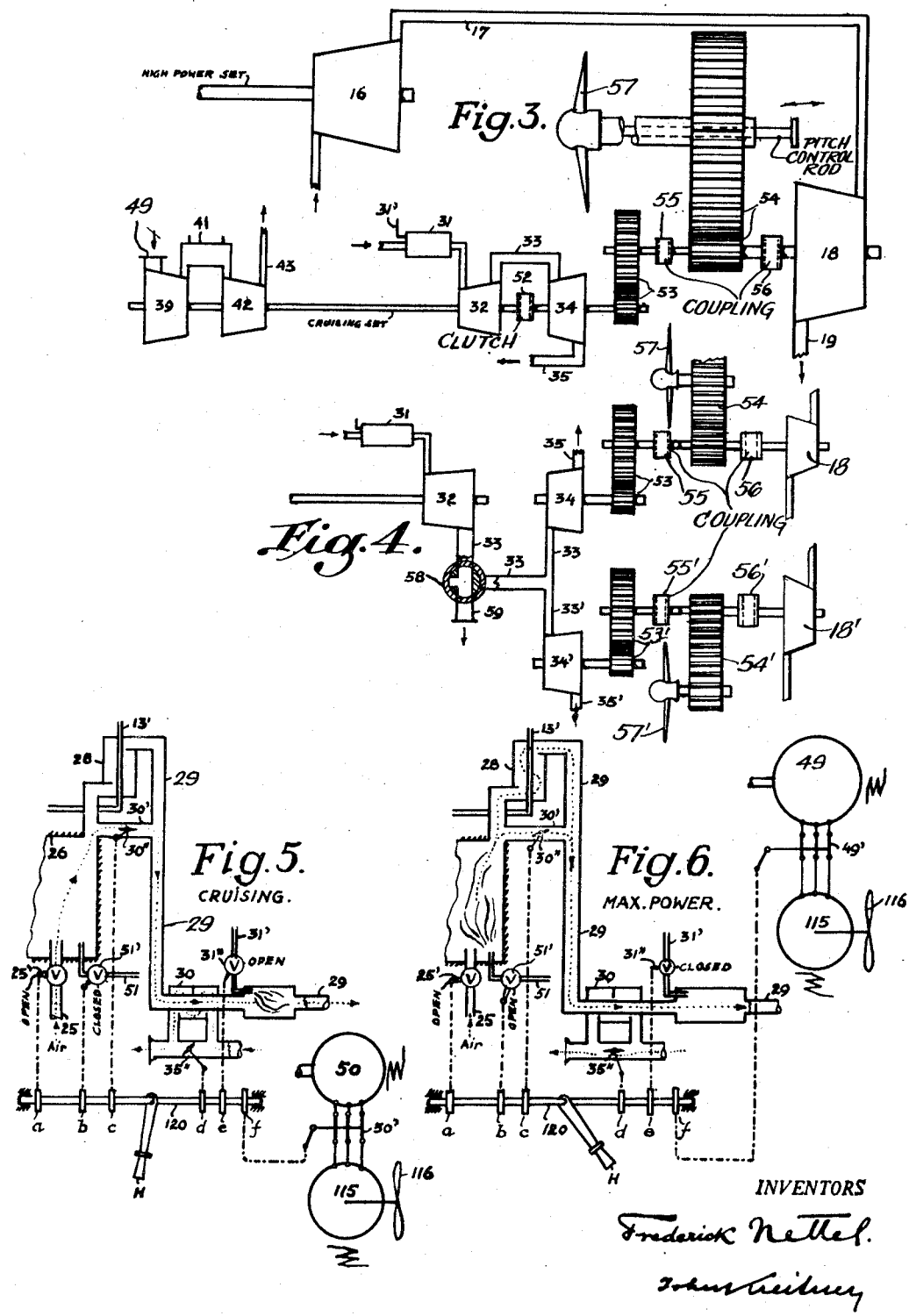

Patented Sept. 27, 1949

2,482,791

UNITED STATES PATENT OFFICE 2,482,791

NAVAL POWER PLANT

Frederick Nettel, Manhasset, and John Kreitner, New York, N. Y.

Application April 20, 1945, Serial No. 589,360

6 Claims. (Cl. 115—34)

This invention relates to combustion power plants of the continuous heating type, particularly for ship propulsion.

Combustion power plants as known, working on semi-closed cycles, are not efficient for use on ships requiring widely different power ranges, as is the case in naval vessels, for maximum (fighting) and cruising power operation. Regulation is complicated and starting is slow.

It is the basic object of this invention to avoid these drawbacks and to provide light plants particularly suited to meet the special conditions indicated above.

This and other more specific objects are achieved by the invention as will be apparent from the following description and claims taken in accordance with accompanying drawings showing diagrammatically by way of non-limiting examples embodiments in which:

Figure 1:
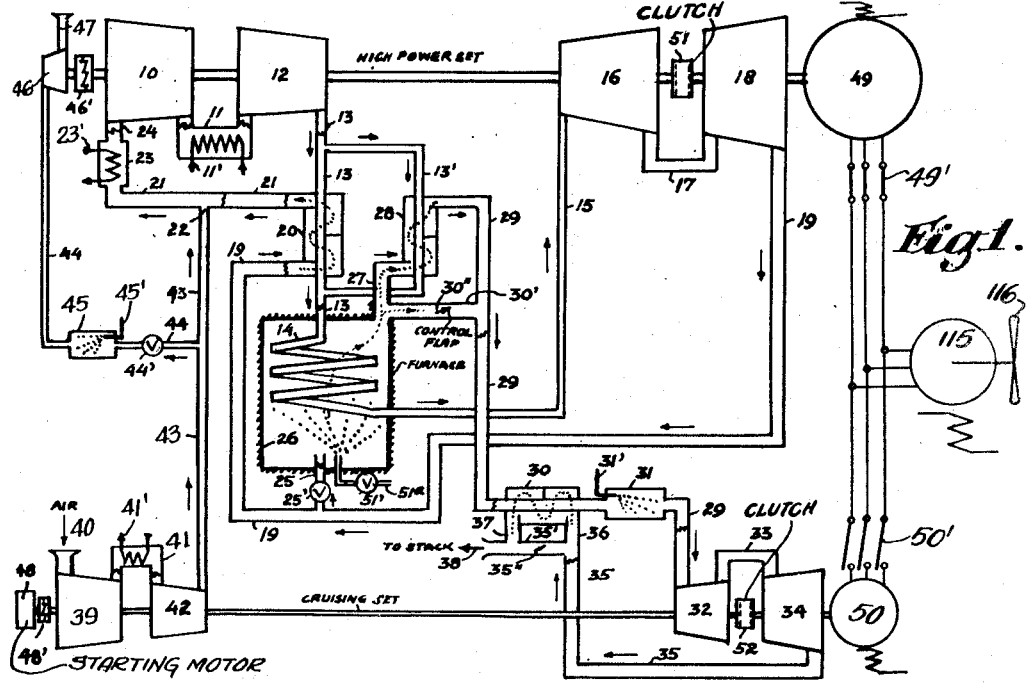
Fig. 1 represents a simple form of the invention with intercooling of the air in the main circuit and electric power transmission to the propeller.

Fig. 3 indicates a modification of plant as per Fig. 1 for mechanical gear transmission to a reversible-pitch propeller.

Fig. 4 represents a detail modification of Fig. 3 for driving two propellers during cruising.

Fig. 5 and Fig. 6 show correlated operating means for plant as per Fig. 1 for cruising and maximum power operation.

The basic object of this invention is achieved by providing:

(a) For high-power operation a high-pressure semi-closed cycle plant with the cruising set maintaining the air balance in the main circuit and (as will be described later) for changing the pressure range in accordance with the load, (b) For cruising utilizing the same cruising set operating as independent combustion turbine plant operating on the open cycle while the machines of the main circuit are at standstill or idling.

For every ship there exists a definite propeller speed-power relationship, with the power increasing very fast with the speed, generally along a curve of more or less parabolic character. The propulsion plant has to be adapted to follow this curve both during high-power operation as well as cruising. To facilitate this the useful power turbines driving the generators or gears are preferably disposed as lowest pressure turbines in the respective cycles, so that part loads at reduced speeds can be conveniently and efficiently furnished.

Referring now more in detail to Fig. 1 of the drawings in which: 10 is a turbo-stage compressor, 11 an intercooler with coil 11' for the cooling medium, 12 a second turbo-stage compressor, 13 a pipe for the compressed air with a branch loop 13' connected to heating coil 14 and pipe 15 leading to the inlet of high-pressure air turbine 16; pipe 17 connecting the latter with medium-pressure air turbine 18. Pipe 19 leads from the outlet of 18 to the recuperative heat exchanger 20 (heating side). The outlet of the latter is connected by pipe 21 to the inlet of air cooler 23, with cooling coil 23' for the cooling medium, whence pipe 24 leads back to the intake of turbo-stage compressor 10. These parts with their connecting pipes form a substantially closed circuit path for the working air.

Branched off from pipe 19 is pipe 25 with valve 25', leading to a closed furnace chamber 26, designed for working at super-atmospheric pressures. Pipe 51a with valve 51' also leads into furnace 26, being connected to an available supply of liquid or gaseous fuel under pressure. From furnace 26 a pipe 27 leads to recuperative heat exchanger 28 disposed around pipe 13'. From 28 pipe 29 leads via cruising heat exchanger 30 (heated side), auxiliary (cruising) combustion chamber 31, with fuel inlet pipe 31', to the inlet of cruising turbine 32 with low-pressure part 34 connected via pipe 33; discharge duct 35 from turbine 34 is connected further by ducts 36 and 37 to the heating side of the cruising heat exchanger 30, and out to the atmosphere at 38. Bypass duct 35' with throttle flap 35'' leads directly from 35 to the stack at 38. Stage turbines 32 and 34 are mechanically connected by a disconnectable clutch 52, for example of the hydraulic type. Another bypass pipe 30' with control flap 30''-connects pipes 27 and 29.

Arranged on the same shaft with the cruising turbine is the cruising compressor consisting of first stage compressor 39 and second stage compressor 42. Between these an intercooler 41 with coil 41' for the cooling medium is disposed. 39 is provided with air intake from the atmosphere at 40, while the compressed air leaves through pipe 42 which leads into the closed main circuit at point 22. Coupled to turbine 18 is the main electric generator 49 via disconnectable clutch 51. Similarly coupled to turbine 34 is cruising generator 50.

Branched off from pipe 43 is pipe 44 with stop valve 44' and interposed starting combustion chamber 45 with fuel inlet pipe 45' receiving fuel under pressure from an available source. Pipe 44 leads to starting turbine 46 with outlet to the atmosphere at 47. Turbine 46 is coupled to the main set 10, 12, 16, 18, 49 by an overrunning clutch 46' as known for such purpose. A starting motor 48 of any kind is coupled via a similar overrunning clutch 48' to set 39, 42, 32, 34, 50.

The plant operates as follows:

For starting, motor 48 is switched in. Cruising set 39, 42, 32 (with clutch 52 preferably disconnected) begins to rotate and an air flow is set up by the cruising compressor 39, 42 via pipes 43, 21, recuperator 20, pipes 19, 25 with valve 25' open, furnace 26, pipe 30' with control flap 30" open, pipe 29, the cruising combustion chamber 31, cruising turbine 32, the standing turbine 34, pipe 35, 36, cruising heat exchanger 30 (heating side), pipe 37 and out to the atmosphere at 38. The main circuit is in communication with this cruising circuit but no flow exists in it since all parts are under the same pressure. As soon as a sufficient air flow is created through cruising combustion chamber 31, fuel is fed through fuel pipe 31'. After igniting said fuel, combustion gases of quickly increasing temperature reach turbine 32 causing it to take over the drive of the compressor 39, 42. With increasing speed of the cruising set, operating as power self-supporting turbine plant, clutch 48' disconnects starting motor 48 which can be stopped. With increasing pressure at compressor outlet, turbine 34 also begins to rotate and useful power can be delivered by the cruising generator 50 to drive the propeller motor (shown in Fig. 2). Since the cruising set operates with intercooling, internal combustion and recuperation in 30, high temperatures can be employed in front of turbine 32 and thus high efficiency for the production of power for cruising assured.

When it is desired to change to high-power performance valve 44' is opened, and fuel is admitted through pipe 45' to the starting combustion chamber 45 and ignited. The hot combustion gases reach starting turbine 46 which via overrunning clutch 46' begins to rotate the main set. Compressors 10 and 12 cause air circulation in the main circuit. Fuel is now admitted to furnace 26 by opening of valve 51' and ignited. The gases begin to heat coil 14 and the air flowing through it which reaches turbine 16 with increasing temperature and enables it to take over the drive of compressors 10 and 12. The starting turbine and its fuel supply can now be disconnected and the main circuit continues as power self-supporting unit, with surplus power available to drive the main generator 49. Instead of air, gases are now flowing via pipe 27, 30' and 29 to the cruising turbine 32 so that the combustion in 31 will extinguish. The fuel supply at 31' can be disconnected. This does not mean, however, that the cruising turbine will stop running since it continues to receive hot gases under pressure to drive it from the furnace. The power derived from these gases, which are colder, is smaller so that only little remains for driving the cruising generator 50 which may have to be disconnected from the propeller altogether. Coupling 52 may be put into operation, with the generator 50 disconnected from its electrical load. The furnace now receives its combustion air from the main circuit through branch pipe 25, said air being replaced by compressor 39, 42 at point 22.

For regulation of the power to be developed in the main circuit the pressure range in that circuit must be varied. This is done by changing the pressure in pipe 43. For example for lower output said pressure must be decreased. This evidently is possible only by decreasing the speed of the compressor 39, 42, or in other words the power of turbine 32, 34 must be decreased. According to this invention this is done by throttling the gas flow through pipe 30'. By so doing, a portion of the furnace gases is forced to flow through recuperative heat exchanger 28 where its temperature is reduced by heat transfer to the compressed air flowing through pipe 13'. A gas mixture of lower temperature now reaches turbine 32 through 29, with the result that turbine 32, 34 delivers less power and the speed of the cruising set drops. A lower pressure results at 22 and with proper reduction in fuel flow to the furnace by adjusting valve 51' a new state of equilibrium is reached quickly. Obviously highest pressure in the main circuit will result if the throttle 30" is fully open. It must be mentioned further that during high-power operation throttle flap 35" is kept fully open, thus bypassing cruising heat exchanger 30 and allowing the gases from turbine 34 to flow via pipe 35' directly to the atmosphere at 38.

Due to the very favorable heat transfer conditions in the supercharged furnace 26, its dimensions and weight become very small, and due to the provision for temperature regulation in front of the cruising turbine a simple, efficient and quickly responding load regulation is achieved.

By utilizing the cruising turbine-compressor set as power self-supporting generator for compressed air for starting the main set, the auxiliary energy required from outside sources is radically reduced which is particularly valuable on ships.

Figure 2:
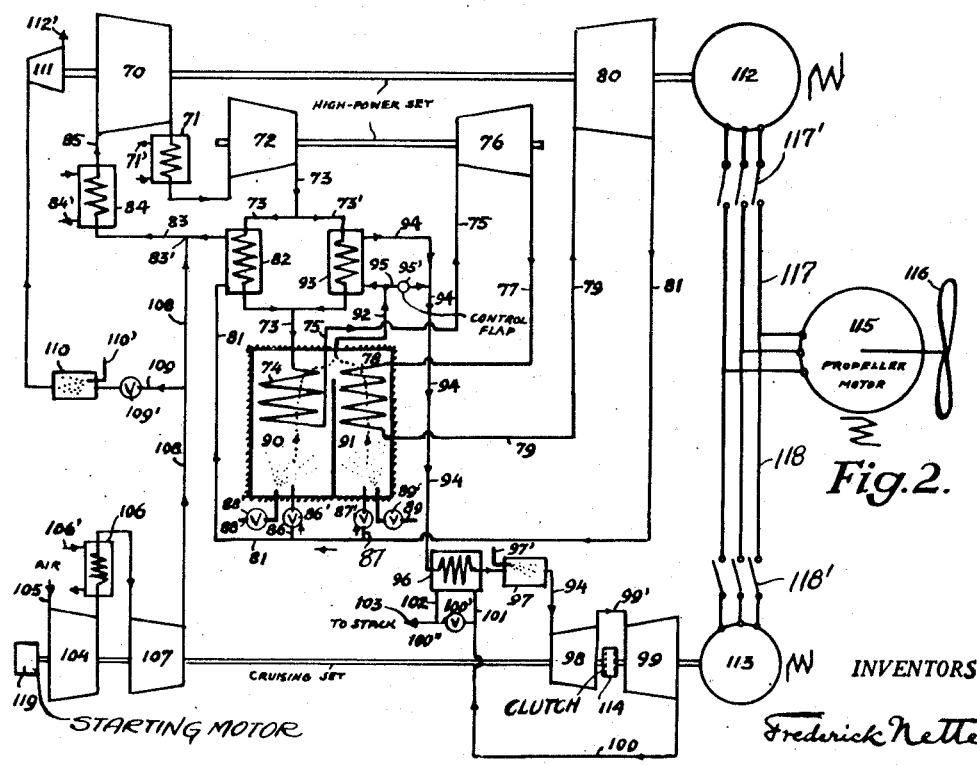
Fig. 2 shows an alternative embodiment with intercooling and reheating in the main circuit.

Fig. 2 shows a plant with intercooling and reheating of the working air in the main circuit with two separately heated furnaces. The machines of the main set are moreover arranged on two separate shafts. 70 is the first stage compressor connected to intercooler 71, with circuit 71' for the cooling medium, further to second stage compressor 72 from which pipe 73, with side loop 73', leads through recuperators 82 and 93 respectively (heated sides): Pipe 73 leads to heating coil 74, disposed within closed furnace 90, designed for operating at superatmospheric pressures; said coil is further connected to pipe 75 leading to the intake of high-pressure air turbine 76. The outlet of latter is connected by pipe 77 to the second heating (reheating) coil 78 disposed within a second closed (reheating) furnace 91 also designed for operating at superatmospheric pressures; coil 78 is further connected via pipe 79 to medium-pressure air turbine 80, from whose outlet pipe 81 leads to the recuperator 82 (heating side). The outlet of the latter is joined by pipe 83 with air cooler 84, equipped with circuit 84' for the cooling medium. From 84 pipe 85 leads back to stage compressor 70. These parts with their connecting pipes form a substantially closed circuit path for the working air.

Branched off from pipe 81 are pipes 86 and 87 with valves 86' and 87' respectively, leading to furnaces 90 and 91. Fuel pipes 88 and 89 with valves 88' and 89' respectively are connected to an available fuel source of liquid, gaseous or solid fuel under pressure, preferably fuel which is substantially non ash or slag forming. Both furnaces have a common outlet by pipe 92 which leads to the recuperative heat exchanger 93 (heating side) disposed in the path of pipe 73' for the compressed air of the main circuit. From 93 pipe 94 leads via cruising heat exchanger 96 (heated side), cruising combustion chamber 97 to cruising turbine 98 with low-pressure part 99 connected by pipe 99', further through ducts 100 and 101 to the heating side of cruising heat exchanger 96, out through duct 102 to stack at 103. Bypass duct 100' with throttle flap 100" connects duct 100 directly to duct 102 and the outlet at 103. Stage turbines 98 and 99 are shown coupled by disconnectable clutch 114. This clutch may be disconnected allowing turbine 99 to drive generator 113 at speeds independent of turbine 98. Under certain circumstances it may be omitted. Another bypass pipe 95, with control flap 95', connects pipe 92 directly with pipe 94.

Coupled with the cruising turbine is the cruising compressor consisting of a first stage compressor 104, with air intake from the atmosphere at 105, an intercooler 106, with circuit 106' for the cooling medium, a second stage compressor 107, discharging through pipe 108 into the main circuit at point 83'.

Main generator 112 is coupled to turbine 88 and stage compressor 70, while turbine 76 is arranged to drive stage compressor 72 on an independent shaft as shown. Starting motor 119 is coupled to compressor 104. Branch pipe 109 with valve 109', starting combustion chamber 110 with fuel pipe 110', and starting turbine 111 with atmospheric outlet 112' are the same as in Fig. 1.

The plant is started and operated basically in the same manner as plant according to Fig. 1, except that there are two streams of combustion air to the two furnaces 90 and 91 into which fuel is fed individually, so that the combustion in each furnace can be adjusted independently of the other. This is desirable under certain operating conditions.

Electric connections 117 and 118 are provided from the A. C. generators 112 and 113 to the propeller driving motor 115 with propeller 116. Interposed in these connections are circuit breakers 117' and 118'.

Fig. 3 shows those parts which, if incorporated in plant as per Fig. 1 make it suitable for mechanical gear drive of a reversible pitch propeller. For this purpose turbine 18 is coupled via hydraulic coupling 56 to the main gear 54 and propeller 57. The pinion of the main gear is also connectable via another hydraulic coupling 55 to cruising gear 53, the pinion of which is coupled to turbine 34 of the cruising set as per Fig. 1.

During high-power operation coupling 56 is operating while couplings 55 and 52 are disconnected. From the description of Fig. 1 it is clear that both the high-power and the cruising sets can operate in case of mechanical gear drive in exactly the same manner, with turbine 18 driving the propeller while the cruising set maintains or regulates the pressure levels in the main circuit.

During cruising couplings 52 and 56 are out of operation while coupling 55 operates. Turbine 18 is at standstill, while turbine 34 drives the propeller via gear 53, coupling 55 and gear 54.

Such arrangement is suitable for operating only one propeller for cruising. However in twin, triple or quadruple propeller ships it is generally desirable to use two propellers for cruising. The modification shown in Fig. 4 is suitable for that purpose.

53 and 53' are the respective cruising gears for driving two propellers. These gears are coupled to two turbines 34 and 34' receiving the driving gases from turbine 32 via three-way valve 58 and pipes 33 and 33' respectively. During high-power operation couplings 55 and 55' are out of operation; valve 58 is in position as shown, allowing the gases issuing from turbine 32 to escape to atmosphere at 59. The turbines 34 and 34' together with their cruising gears 53 and 53' are at standstill.

During cruising operation couplings 55 and 55' are in operation, coupling the cruising gears with the main gears while couplings 56 and 56' disconnected. The working gases from turbine 32 flow via valve 58, pipes 33 and 33' respectively to turbines 34 and 34' allowing these to drive two propellers through cruising gears. Obviously, it is feasible to use the arrangement as per Fig. 4 for one turbine 34 only to drive one propeller during cruising.

While reversible-pitch propellers have been employed in the examples as per Figs. 3 and 4, fixed-pitch propellers may be used with reversing gears.

Fig. 5 shows how correlating means for jointly actuating the various operating means are incorporated in a plant as per Fig. 1 for cruising, while Fig. 6 shows these correlating means with the operating means in position for maximum power. The correlation is achieved by a shaft 120 equipped with cams $a$, $b$, $c$, $d$, $e$ and $f$ and hand lever H. From said cams actuation means of any known kind, for example rods and levers, indicated by dot-dash lines influence the various valves and switches by turning of hand lever H for cruising or maximum power operation of the plant. In Fig. 5 for cruising valve 25' is open, valve 51' closed, flap 30" open, flap 35" closed, valve 31" open, switch 50' between cruising generator and propeller motor 115 closed. In Fig. 6 for maximum power valve 25' is open, valve 51' open, flap 30" closed to a varying degree, flap 35" open, valve 31" closed, switch 49' between main generator 49 and propeller motor 115 closed. Obviously the opening of valves 25' and 51' must be properly coordinated to achieve complete combustion in furnace 26 at all loads.

It is immaterial for the purposes of this invention what particular types of compressors and expansion means are used, whether the expansion means are arranged in series or in parallel as regards the flow of the working medium, whether they are disposed on one or several independent shafts, whether or not intercoolers for the air and/or reheaters are employed. Having now described and illustrated several forms embodying our invention, we wish it to be understood that our invention is not limited to the specific form or arrangement of parts shown and described herein, or specifically covered by our claims.

What we claim is:

1. In a combustion power plant of the continuous heating type for the propulsion of ships requiring widely different power ranges for maximum and cruising powers, comprising main air compressor means for compressing a stream of air, main air expansion means for developing power first power transmission means connecting said expansion means and said compressor means, a ship propeller, first disconnectable power transmission means disposed to connect said expansion means to said propeller, first conduit means from said compressor to said expansion means comprising heat exchange surfaces for heating said compressed air stream by heat exchange with the air issuing from said expansion means and with hot gases from the combustion of fuel, a furnace for the production of said gases arranged for combustion at superatmospheric pressures, second conduit means for returning a substantial portion of said air stream from the outlet of said expansion means to the inlet of said compressor in a substantially closed main circuit arranged to operate within ranges of superatmospheric pressures, said second conduit means comprising heat exchange surfaces for effecting said heat exchange with the compressed air issuing from said main compressor means, and cooling means for the return air disposed in front of the inlet to said main compressor means, third conduit means branching off said second conduit means for leading the remaining portion of said stream issuing from said main air expansion means to said furnace to serve therein as combustion air for the fuel burned during maximum power operation, cruising compressor means, a cruising combustion chamber with valved fuel admission pipe, cruising gas expansion means for developing power, and fourth conduit means connecting said furnace in succession to said cruising combustion chamber, to said cruising gas expansion means, and thence to the atmosphere; second disconnectable power transmission means disposed to connect said cruising expansion means to said same ship propeller, and second power transmission means connecting said cruising expansion means to said cruising compressor means, the latter being disposed to take in a continuous air stream from the ambient atmosphere and to discharge it into said second conduit means between said heat exchange surfaces and the inlet of said main compressor means; operating means for connecting the power transmission means between the ship propeller and said main air expansion means, for disconnecting said power transmission means between said same ship propeller and the cruising expansion means, and for opening said fuel feed valve means to the furnace during operation of the plant for maximum power; said operating means also disposed for disconnecting the power transmission means from the main expansion means, connecting the power transmission means from the cruising expansion means to said propeller, closing said fuel feed valve means to the furnace, and opening said fuel feed valve means to the cruising combustion chamber to effect combustion therein during operation of the plant for cruising.

2. In a combustion power plant of the continuous heating type for the propulsion of ships requiring widely different power ranges for maximum and cruising powers, comprising main air compressor means for compressing a stream of air, main air expansion means for developing power first power transmission means connecting said expansion means and said compressor means, a ship propeller, first disconnectable power transmission means disposed to connect said expansion means to said propeller, first conduit means from said compressor to said expansion means comprising heat exchange surfaces for heating said compressed air stream by heat exchange with the air issuing from said expansion means and with hot gases from the combustion of fuel, a furnace for the production of said gases arranged for combustion at superatmospheric pressures, second conduit means for returning a substantial portion of said air stream from the outlet of said expansion means to the inlet of said compressor in a substantially closed main circuit arranged to operate within ranges of superatmospheric pressures, said second conduit means comprising heat exchange surfaces for effecting said heat exchange with the compressed air issuing from said main compressor means, and cooling means for the return air disposed in front of the inlet to said main compressor means, third conduit means branching off said second conduit means for leading the remaining portion of said stream issuing from said main air expansion means to said furnace to serve therein as combustion air for the fuel burned during maximum power operation cruising compressor means, a cruising combustion chamber with valved fuel admission pipe, cruising gas expansion means for developing power, and fourth conduit means connecting said furnace in succession to said cruising combustion chamber, to said cruising gas expansion means, and thence to the atmosphere; second disconnectable power transmission means disposed to connect said cruising expansion means to said same ship propeller, and second power transmission means connecting said cruising expansion means to said cruising compressor means, the latter being disposed to take in a continuous air stream from the ambient atmosphere and to discharge it into said second conduit means between said heat exchange surfaces and the inlet of said main compressor means; operating means for connecting the power transmission means between the ship propeller and said main air expansion means, for disconnecting said power transmission means between said same ship propeller and the cruising expansion means, and for opening said fuel feed valve means to the furnace during operation of the plant for maximum power; said operating means also disposed for disconnecting the power transmission means from the main expansion means, connecting the power transmission means from the cruising expansion means to said propeller, closing said fuel feed valve means to the furnace, and opening said fuel feed valve means to the cruising combustion chamber to effect combustion therein during operation of the plant for cruising; and correlating means for jointly actuating said operating means.

3. In a combustion power plant of the continuous heating type for the propulsion of ships requiring widely different power ranges for maximum and cruising power, comprising main air compressor means for compressing a stream of air, main air expansion means for developing power first power transmission means connecting said expansion means and said compressor means, a ship propeller, first disconnectable power transmission means disposed to connect said expansion means to said propeller, first conduit means from said compressor to said expansion means comprising heat exchange surfaces for heating said compressed air stream by heat exchange with the air issuing from said expansion means and with hot gases from the combustion of fuel, a furnace for the production of said gases arranged for combustion at superatmospheric pressures, second conduit means for returning a substantial portion of said air stream from the outlet of said expansion means to the inlet of said compressor in a substantially closed main circuit arranged to operate within ranges of superatmospheric pressures, said second conduit means comprising heat exchange surfaces for effecting said heat exchange with the compressed air issuing from said main compressor means, and cooling means for the return air disposed in front of the inlet to said main compressor means, third conduit means branching off said second conduit means for leading the remaining portion of said stream issuing from said main air expansion means to said furnace to serve therein as combustion air for the fuel burned during maximum power operation cruising compressor means, a cruising combustion chamber with valved fuel admission pipe, cruising gas expansion means for developing power, and fourth conduit means connecting said furnace in succession to said cruising combustion chamber, to said cruising gas expansion means, and thence to the atmosphere; second disconnectable power transmission means disposed to connect said cruising expansion means to said same ship propeller, and second power transmission means connecting said cruising expansion means to said cruising compressor means, the latter being disposed to take in a continuous air stream from the ambient atmosphere and to discharge it into said second conduit means between said heat exchange surfaces and the inlet of said main compressor means, operating means for connecting the power transmission means between the ship propeller and said main expansion means, for disconnecting said power transmission means between said same ship propeller and the cruising expansion means, and for opening said fuel feed valve means to the furnace during operation of the plant for maximum power; said operating means also disposed for disconnecting the power transmission means from the main expansion means, connecting the power transmission means from the cruising expansion means to said propeller, closing said fuel feed valve means to the furnace, opening said fuel feed valve means to the cruising combustion chamber to effect combustion therein during operation of the plant for cruising; heat exchanger means for heating the compressed air issuing from the main compressor means, the heating side having two separate passages, one interposed in said second conduit means for the return air, the latter interposed in said conduit means from the furnace to said cruising combustion chamber, conduit means branching off said latter conduit means in front of said second passage bypassing it, and regulatable flow control valve means for varying the quantity of bypass gases and thereby controlling the temperature of the gases at the inlet to said cruising expansion means during maximum power operation of the plant.

4. In a combustion power plant according to claim 1, regenerative heat exchange means with the heated side interposed in said fourth conduit means from the furnace to the cruising combustion chamber, the heating side interposed between the outlet of said cruising expansion means and the atmosphere for transferring heat from the gases issuing from said latter expansion means to the compressed air supplied by said cruising compressor prior to its entrance to said cruising combustion chamber during cruising operation of the plant, and valve fifth conduit means for said expanded gases for bypassing said regenerative heat exchange means during maximum power operation of the plant.

5. In a combustion power plant according to claim 1, said main air expansion means comprising high pressure expansion means and medium pressure expansion means, first and second fuel burning surface type reheating means interposed between said high pressure and said medium pressure expansion means.

6. In a combustion power plant according to claim 1, said main air expansion means comprising first stage expansion means and second stage expansion means, said first power transmission means connecting said first stage main expansion means to said main compressor means, and said first disconnectable power transmission means disposed to connect said second stage main expansion means to said propeller, cruising gas expansion means comprising first stage and second stage expansion means, said second power transmission means connecting said first stage cruising expansion means to said cruising compressor means, said second disconnectable power transmission means disposed to connect said second stage cruising expansion means to said same propeller, said first and second stage main expansion means being arranged mechanically independent of each other and in series as regards the flow of the working air through them, and said first and second stage cruising expansion means being arranged mechanically independent of each other and in series as regards the flow of the working gas through them.

FREDERICK NETTEL.
JOHN KREITNER.

REFERENCES CITED

The following references are of record in the file of this patent:

UNITED STATES PATENTS

| Number | Name | Date |
| --- | --- | --- |
| 2,268,270 | Traupel | Dec. 30, 1941 |
| 2,318,905 | Traupel | May 11, 1943 |
| 2,341,490 | Traupel | Feb. 8, 1944 |
| 2,374,510 | Traupel | Apr. 24, 1945 |

FOREIGN PATENTS

| Number | Country | Date |
| --- | --- | --- |
| 212,104 | Switzerland | Feb. 3, 1941 |